(12) United States Patent
Yarbrough et al.

(10) Patent No.: US 7,080,720 B1
(45) Date of Patent: Jul. 25, 2006

(54) TORQUE CONVERTER

(75) Inventors: Robert Yarbrough, Parcell, OK (US);
Kevin Blumenthal, Edmond, OK (US);
Lewis Eidson, Norman, OK (US);
Richard Walker, Oklahoma City, OK (US)

(73) Assignee: Blumental Automatic, Inc., Oklahoma City, OK (US)

( * ) Notice: Subject to any disclaimer, the term of this patent is extended or adjusted under 35 U.S.C. 154(b) by 0 days.

(21) Appl. No.: 11/065,404

(22) Filed: Feb. 24, 2005

(51) Int. Cl.
*F16H 45/02* (2006.01)

(52) U.S. Cl. ................. 192/3.29; 192/110 B; 384/123; 384/368

(58) Field of Classification Search ............... 192/3.28, 192/3.29, 3.3, 110 B; 384/123, 368
See application file for complete search history.

(56) References Cited

U.S. PATENT DOCUMENTS

| | | | |
|---|---|---|---|
| 4,007,974 A * | 2/1977 | Huber | 384/123 |
| 4,177,885 A | 12/1979 | Ross | |
| 4,692,977 A * | 9/1987 | Maze | 29/889.5 |
| 5,040,647 A * | 8/1991 | Ratner | 192/3.28 |
| 5,062,517 A * | 11/1991 | Muchmore et al. | 192/3.29 |
| 5,070,974 A | 12/1991 | Kirkwood | |
| 5,211,270 A | 5/1993 | Tamura et al. | |
| 5,337,867 A | 8/1994 | Kirkwood | |
| 5,441,135 A | 8/1995 | Worner et al. | |
| 5,669,475 A * | 9/1997 | Matsuoka | 192/3.29 |
| 5,799,763 A | 9/1998 | Dehrmann | |
| 5,829,888 A | 11/1998 | Bhargava et al. | |
| 5,918,713 A | 7/1999 | Shimizu et al. | |
| 6,282,785 B1 * | 9/2001 | Kolodziej et al. | 29/889.5 |
| 6,502,994 B1 | 1/2003 | Jackson | |
| 6,622,834 B1 | 9/2003 | Bornschier et al. | |
| 6,705,434 B1 | 3/2004 | Bunker | |
| 6,711,895 B1 | 3/2004 | Miura et al. | |
| 2004/0026202 A1 | 2/2004 | Cannon et al. | |

FOREIGN PATENT DOCUMENTS

JP          11148547 A  *  6/1999

* cited by examiner

*Primary Examiner*—Richard M. Lorence
(74) *Attorney, Agent, or Firm*—David W. Carstens; Chad E. Walter; Carstens & Cahoon, LLP

(57) ABSTRACT

An improved torque converter that results in greater fuel efficiency and more horsepower with a lower failure rate. The improved torque converter has a greater lock-up surface area than an original equipment torque converter to reduce slippage. The lock-up surface area can be provided from a wider friction lining material, a floating clutch, and/or a floating clutch plate. An improved stator contributes to fuel efficiency. In one aspect, the torque converter has a novel thrust washer that has parabolic shaped grooves to facilitate lubrication and reduce failure of the bearing thrust washer. In one aspect the torque converter uses brazed blades to reduce vibration and strengthen the blades to make them more resistant to distortion and failure.

5 Claims, 11 Drawing Sheets

TORQUE CONVERTER

BACKGROUND OF THE INVENTION

1. Technical Field

This invention relates to improvements to a torque converter for use with an automatic transmission, and more particularly to an improved torque converter that increases the gas mileage and horsepower of a vehicle.

2. Description of Related Art

Figure 1:
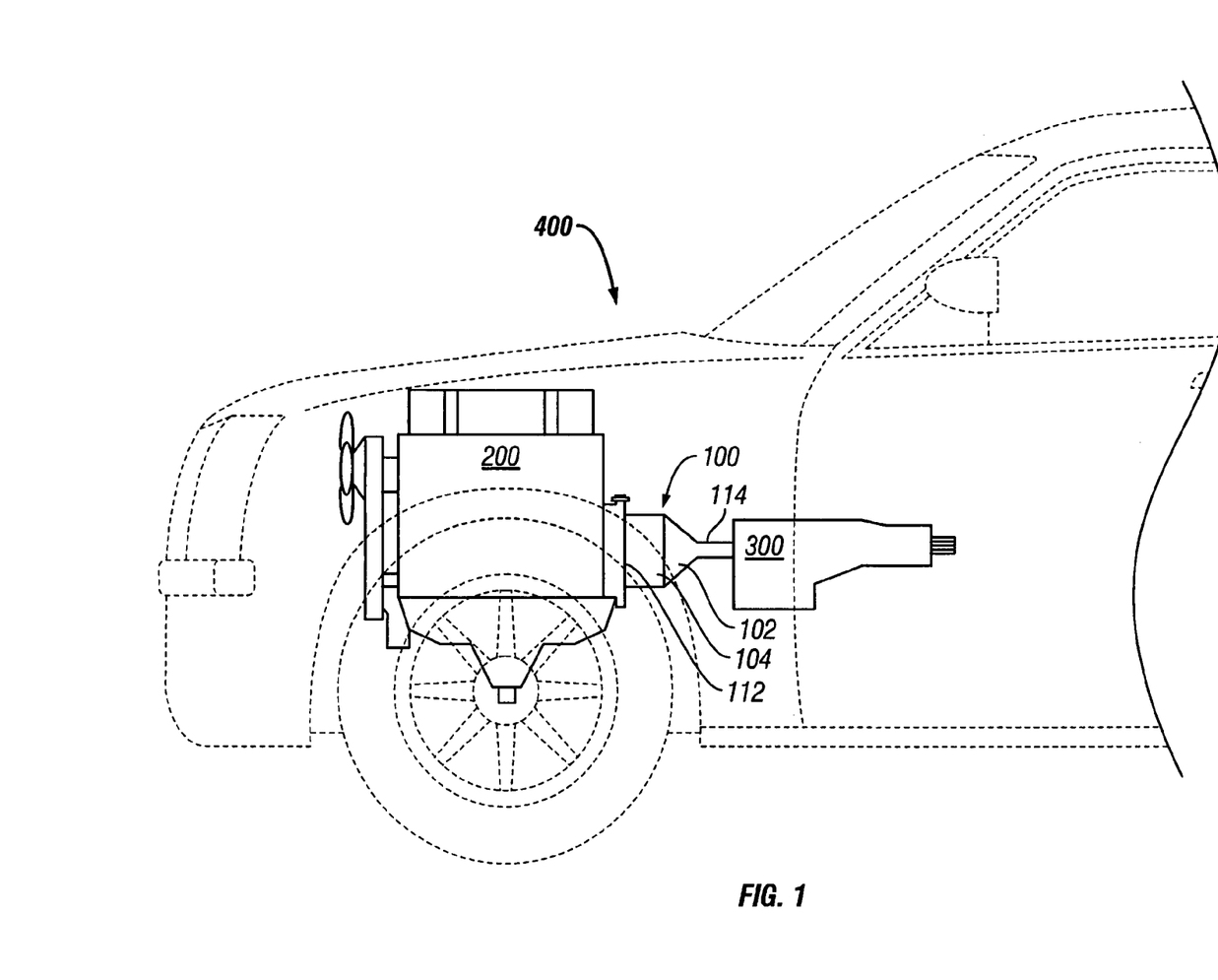
FIG. 1 is a side view of a vehicle having an engine and a transmission connected by a torque converter.

FIG. 1 is a side view of a vehicle 400 having an engine 200 and a transmission 300 connected by a torque converter 100. In a vehicle 400 with an automatic transmission, the torque converter 100 provides the link between the engine 200 and the transmission 300.

Figure 2:
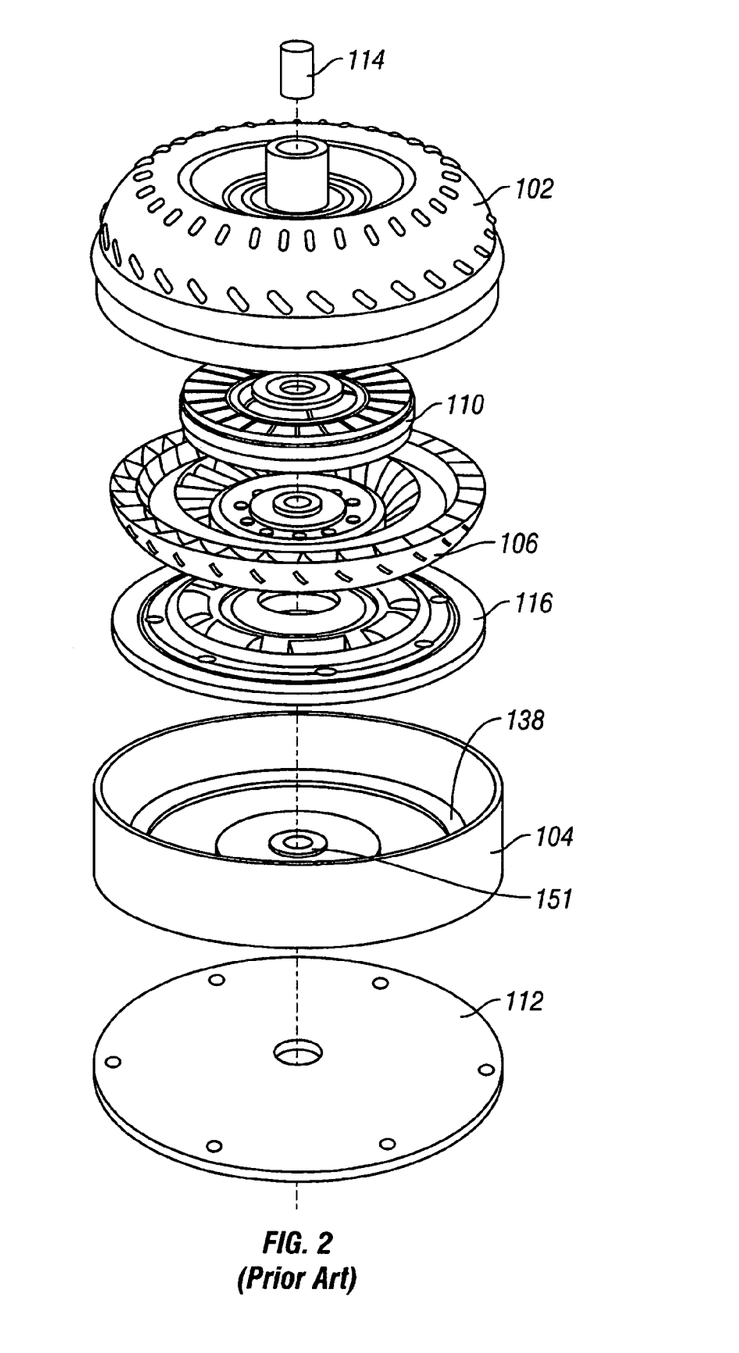
FIG. 2 is an exploded view of a prior art original equipment torque converter.

FIG. 2 is an exploded view of a prior art original equipment ("OE") torque converter, or torque converter that is originally a part of the vehicle when the vehicle is sold. The prior art torque converter has a drive member 112 attached to an engine crankshaft or flywheel and an impeller/pump 102 that is generally adjacent the transmission. The impeller/pump 102 is attached to the cover 104, typically by a welded seam. Residing within the cover 104 is a one-half inch friction lining (transverse direction) disposed upon a ledge 138 of metal that is welded to the inside of the cover 104. The OE friction lining and ledge height (axial direction) can be 0.115 inches. The friction-lined ledge 138 frictionally engages with the piston 116 within the cover 104 and thus rotates upon engagement with the cover 104.

The torque converter is typically filled with a viscous fluid such as automatic transmission fluid. Once the engine is started, the drive member 112 and cover 104 rotate at engine speed. Because the impeller 102 is attached to the cover 104, the impeller 102 also rotates at engine speed, or at impeller revolutions per minute (RPM). Fluid enters through the input shaft/drive member 114 into the cover 104 and then towards the impeller 102. The impeller 102 has a series of longitudinal fins, vanes, or blades, which drives the fluid around the outside diameter of the impeller 102 into the turbine 106. The impeller 102 thus functions like a centrifugal pump. This pumping of fluid transfers power from the impeller 102 towards the turbine 106 and causes the turbine 106 to rotate. The turbine 106 is attached to a drive member 114 via a spline to the input shaft 114 of the transmission. When the turbine 106 rotates, the vehicle moves.

Although the impeller 102 rotates at engine speed ("Impeller RPM"), the turbine 106 must overcome a load to begin rotation. For example, the Impeller RPM must produce enough energy to permit the turbine 106 to overcome the resistance to move the vehicle from a resting position. The number and shape of the impeller and turbine blades has an impact on the efficiency of the torque converter. Because the blades help to channel the fluid to provide a driving force, substantial torsional forces are imparted on the blades, increasing the likelihood of distortion or failure over time. Failure and distortion of the traditionally tack welded impeller and/or turbine blades is undesirable because it affects the fluid driving force flow paths which can lower efficiency of power transfer from the impeller 102 to the turbine 106. In addition, failure can cause metal pieces of the blades to be deposited into the transmission fluid. This can result in further damage to various moving and non-moving parts in the torque converter and transmission alike. Consequently, there is a need for impeller and turbine blades that can better withstand torsional forces.

The torque converter typically operates in two modes—stall mode and lock-up mode. Stall mode is when the Impeller RPM is greater than the Turbine RPM. The torque converter is in stall mode during vehicle acceleration. In the stall mode, a torque converter can create a torque multiplier effect. A torque multiplier effect occurs when more torque is output to the drive wheels than the engine is actually producing. This can result in more horsepower and greater fuel efficiency. A typical torque converter will have a torque multiplication ratio of about 2.5:1. Lock-up mode is when the Impeller RPM is substantially equal to the Turbine RPM. The ratio of the Turbine RPM to the Impeller RPM defines the amount of hydrodynamic slippage. Mechanical slippage can and does occur in areas where the moving parts frictionally engage.

As the Impeller RPM increases during acceleration, the turbine 106 moves axially toward the cover 104 and pressure is applied against the piston 116 and the friction lined ledge 138 inside of the cover 104. The fluid entering through the input shaft 114 near the thrust washer 151 causes fluid to apply back pressure (force directed away from cover 104) to the piston 116 and prevents lock-up. An electric solenoid controls the flow of fluid through the input shaft 114 and thereby adjusts the centrifugal force on the piston 116. For example, when the solenoid stops the flow of fluid through the input shaft to the cover 104, back pressure on the piston 116 is eliminated and the torque converter goes into lockup, meaning that the turbine 106, piston 116, and the friction lined ledge 138 inside the cover 104 frictionally engage one another and lock. One problem with this design is that the torsional forces can overcome the frictional forces resulting in mechanical slippage. Mechanical slippage can occur when the cover 104 RPM is greater than the piston 116 RPM. As slippage increases, fuel efficiency and horsepower decreases. It is therefore desirable to decrease the amount of slippage and/or the amount of time that the torque converter is in the stall mode.

As previously discussed, the stator 110 changes the fluid flow between the impeller 102 and the turbine 106 and is responsible for the torque multiplier effect. During vehicle acceleration, the torque converter is in the stall mode. The stator 110 redirects and further accelerates fluid as it returns from the turbine 106 through the stator 110 fins in an outward radial direction to increase the amount of engine torque transferred between the impeller 102 and the turbine 106 and acts as a torque transfer multiplier. As a result, Turbine RPM is able to more efficiently approach the Impeller RPM, thereby reducing slippage. Thus, the torque converter 100, principally due to the stator 110, helps to reduce slippage and thereby increases fuel efficiency and horsepower. Changes to the stator 110 that can enhance torque converter efficiency are desirable. Consequently, a need exists to improve the stator to further improve fuel efficiency and horsepower.

Figure 3:
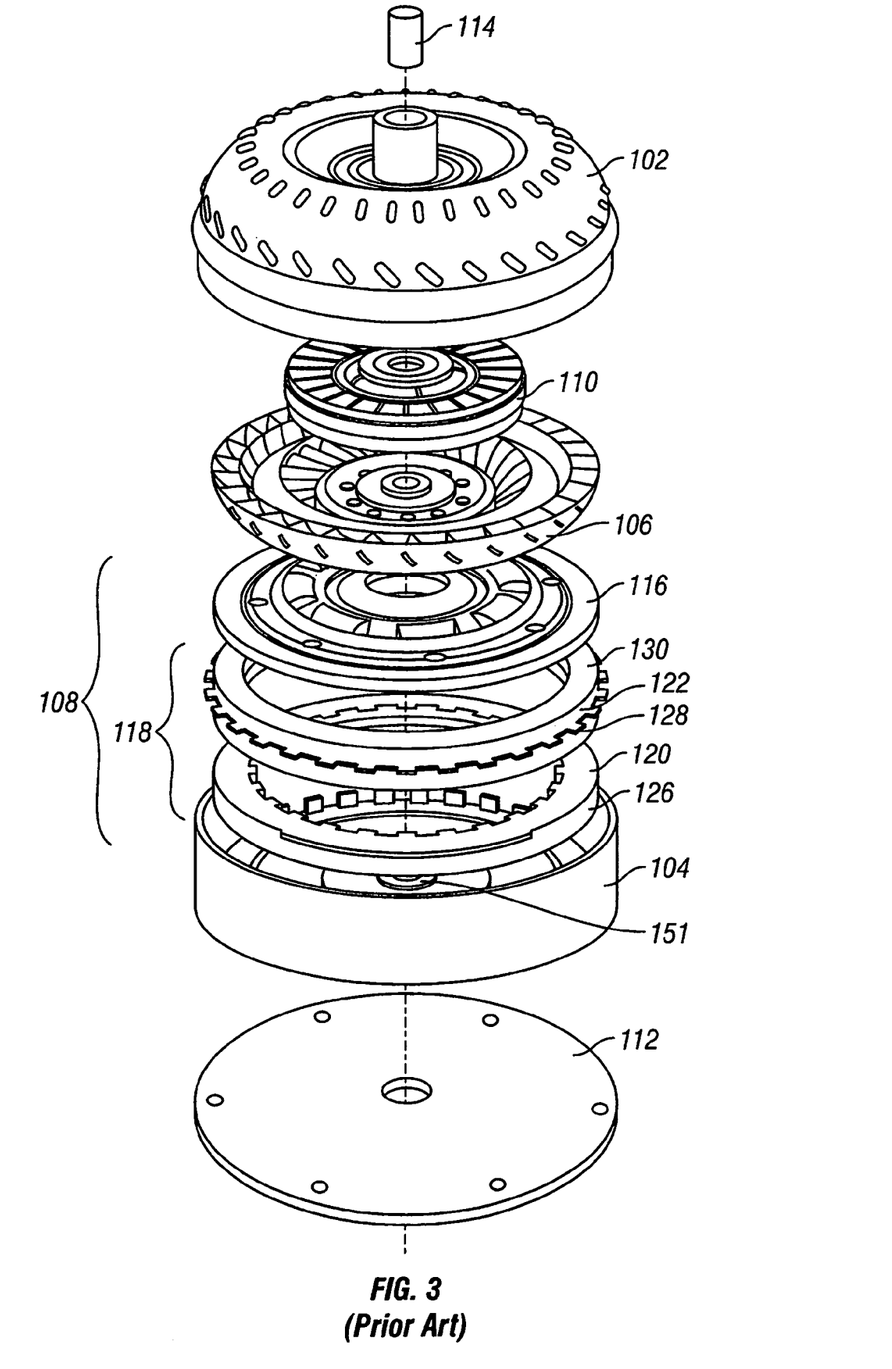
FIG. 3 is an exploded view of a prior art after market torque converter.

FIG. 3 is an exploded view of a prior art after market torque converter 100. Residing within the cover 104 is a first ring 120 and a second ring 122. The first ring 120 has a first side facing the cover 104 and a second side facing the impeller/pump 102. Similarly, the second ring 122 has a first side facing the cover 104 and a second side facing the impeller/pump 102. The first ring 120 has a friction lining 126 on the first side. The second ring 122 has a friction lining 128 on the first side and a friction lining 130 on the second side. The second ring 122 has a set of tabs splined to the lugs within the cover 104 and thus rotates upon engagement with the cover 104. The cover 104 turns at engine speed. The first ring 120 has a set of tabs that are splined to the lugs on the piston 116 and thus rotates with the piston 116. The first ring 120 and second ring 122 make up the clutch pack 118. The clutch pack 118 and the piston 116 make up the lock up clutch 108. The piston 116 is splined to the turbine 106 and thus rotates with the turbine 106.

As the Impeller RPM increases during acceleration, the turbine 106 moves axially toward the cover 104 and pressure is applied against the piston 116, rings 120 122 and the inside of the cover 104. At a certain lock-up pressure, the piston 116, rings 120 122 and cover 104 frictionally engage one another and lock. Upon engagement, the inner, raised portion of the piston 116 (not shown) mates with a thrust washer 151 attached to the center of the cover 104. The purpose the torque converter design is to transfer torsional forces from the rings 120 122 to the cover 104 and the piston 116. Upon lock-up, the clutch pack 118 and thrust washer 151 is subjected to extreme torsional forces. These torsional forces can lead to premature failure of the thrust washer 151, rendering the torque converter inoperable. In addition, failure of the thrust bearing can cause metal filings to be deposited within the transmission fluid, which can further cause damage to the transmission and the torque converter. Consequently, there is a need for an improved torque converter that is less prone to failure.

SUMMARY OF THE INVENTION

The invention relates to an improved torque converter. In one aspect, the lock-up surface area between the piston and the cover is increased. This increase can occur in several ways including insertion of a floating clutch, insertion of a floating clutch plate, or insertion of bonded friction liner having a greater surface area. These ways can be used in part or in combination. A greater surface area can reduce the amount of mechanical slippage and increase gas mileage.

In one aspect, a stator having less vane surface area is used to provide fluid transfer from the impeller to the turbine at a faster rate thereby decreasing the time required to achieve lock-up. In one aspect, the invention comprises a thrust washer having a plurality of parabolic shaped grooves in communication with the inner and outer diameter of the thrust washer. This provides lubrication necessary for high torsion encountered by the thrust washer. As the piston engages the bearing thrust washer and lock up mode occurs, lubrication extends the service life of the thrust washer and the amount of metal filings in the transmission fluid is reduced. In one embodiment, the thrust washer is a floating thrust washer.

In one aspect, brazed impeller and turbine blades provide additional strength to withstand the high torsional forces imparted when the impeller transfers energy to the turbine. The brazed blades provide for reduced vibration and further enhances efficiency of energy transfer.

Hence, this invention produces an improvement to a torque converter that decreases the likelihood of failure thereby extending torque converter life. Further, a greater surface area can reduce the amount of mechanical slippage. Thus, greater horsepower and fuel efficiency is achieved. The above as well as additional features and advantages of the present invention will become apparent in the following written detailed description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

FIG. 9b is a turbine-side perspective bottom view of a stator depicted in FIG. 9a.

DETAILED DESCRIPTION

Figure 4:
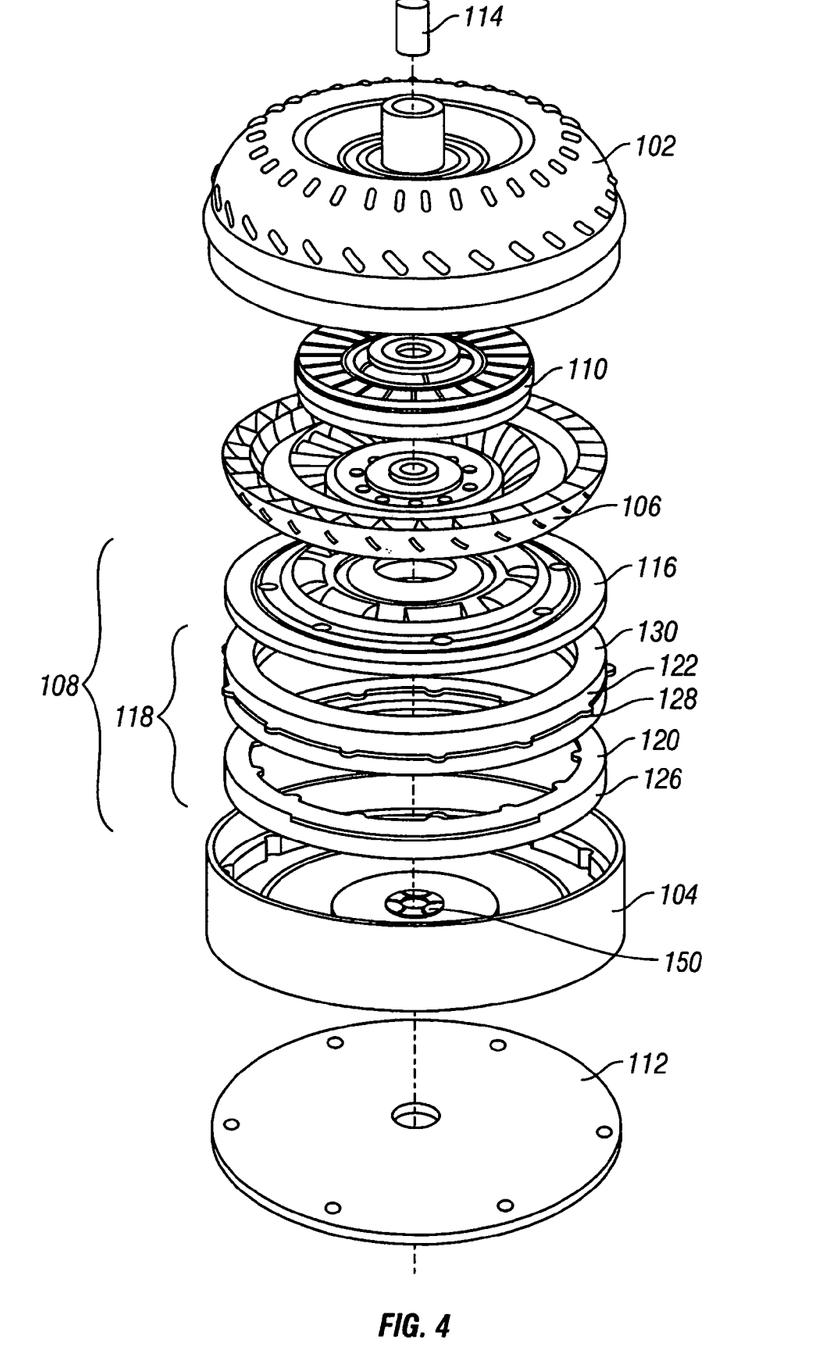
FIG. 4 is an exploded view of a torque converter having a bearing thrust washer in accordance with one embodiment of the present invention.
Figure 8:
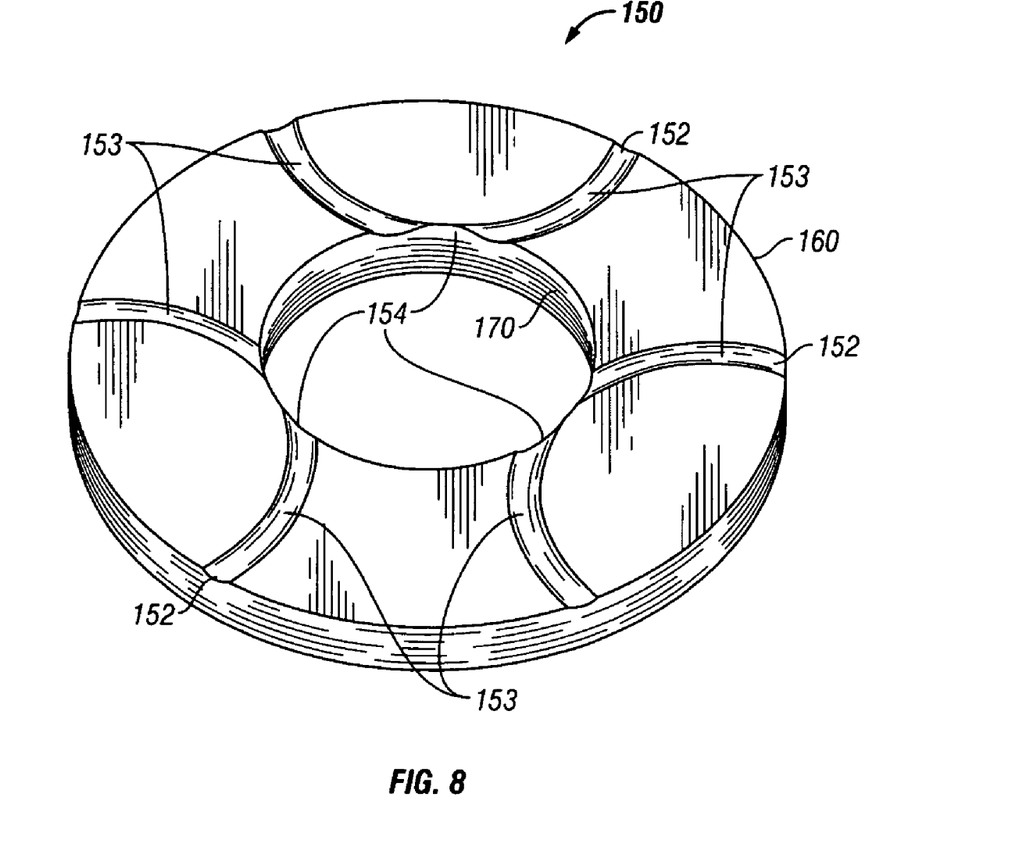
FIG. 8a is a perspective view of a bearing thrust washer depicted in FIG. 4.
FIG. 8b is a perspective view of a bearing thrust washer in accordance with one embodiment of the present invention.
Figure 8A:
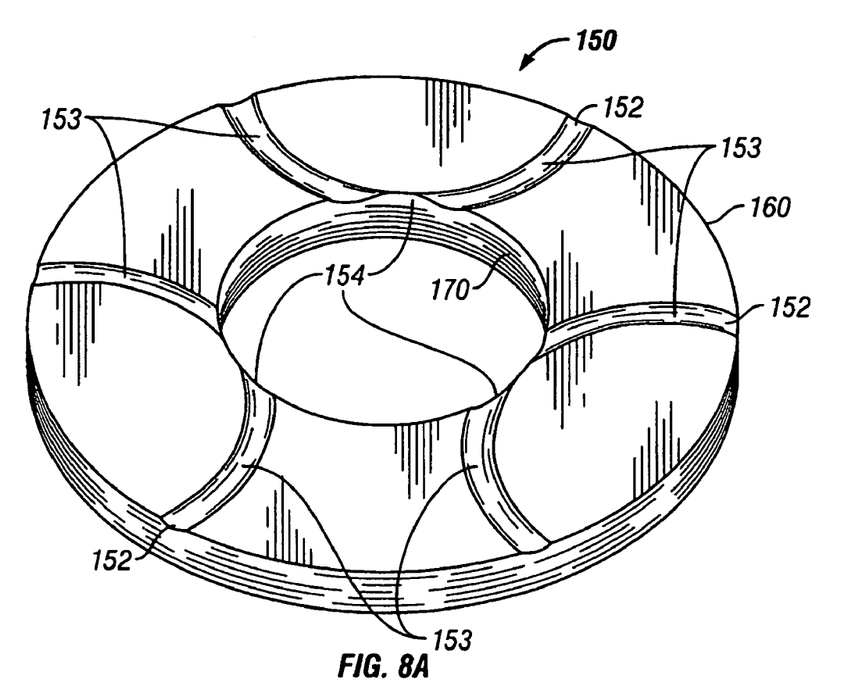
Figure 8B:
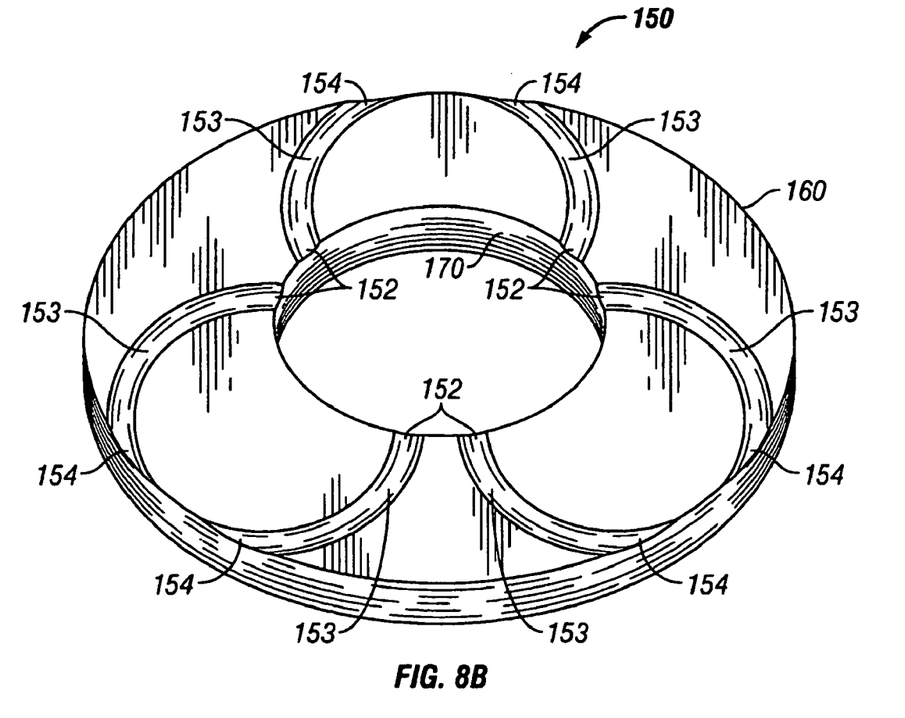

FIG. 4 is an exploded view of a torque converter having a bearing thrust washer 150 in accordance with one embodiment of the present invention. FIG. 8a is a perspective view of a bearing thrust washer 150 depicted in FIG. 4. It has been surprisingly found that the bearing thrust washer life can be substantially extended when grooves of a certain configuration are used. Referring to FIGS. 4 and 8a, the thrust washer 150 comprises an outer circumference 160 and an inner circumference 170. The thrust washer comprises a first side facing the cover 104 and a second side facing the impeller 102. The second impeller-facing side comprises at least one parabolic-shaped groove. Each parabolic-shaped groove has a leg end 152 and a dome end 154. These grooves facilitate lubrication between the piston 116 and the cover 104. Although the grooves are depicted with the leg ends 152 adjacent the outside circumference 160 and the dome end 154 adjacent the inside circumference 170, the parabola can face either direction, as illustrated by FIG. 8b. The parabolic shaped grooves promote unobstructed fluid flow to provide sufficient lubrication and prevents potential clogging. In one embodiment, the bearing thrust washer 150 comprises at least two parabolic-shaped grooves facing opposite directions. The groove itself can be v-shaped or rounded. The groove should be dimensioned so as to permit sufficient lubrication.

As a vehicle equipped with a torque converter in accordance with an embodiment of the present invention accelerates, the transmission fluid is able to flow through the thrust washer and lubricate the washer. In one test it was surprisingly discovered the a thrust washer made of brass having three parabolic shaped grooves in accordance with FIG. 8a, displayed little or no observable wear after being placed in a vehicle for 40,000 miles.

In one embodiment, the impeller 102 blades are brazed. In one embodiment, the turbine 106 blades are brazed. To braze the blades, a brazing compound is applied to the welded seam areas. Titanium alloys can be used for brazing compounds. Once the brazing compound is added to the blades, the item is placed into a furnace or oven to permit the brazing compound to flow into the seams and reinforce the seams. It has been discovered that brazed impeller and/or turbine blades decreases the vibration of the blades. As a result, a more efficient energy transfer from the impeller 102 to the turbine 106 can occur. Brazing also stiffens the blades and causes them to be less prone to distortion and failure. Hence, the instant invention results in a torque converter having a long life and low failure rate.

Figure 5:
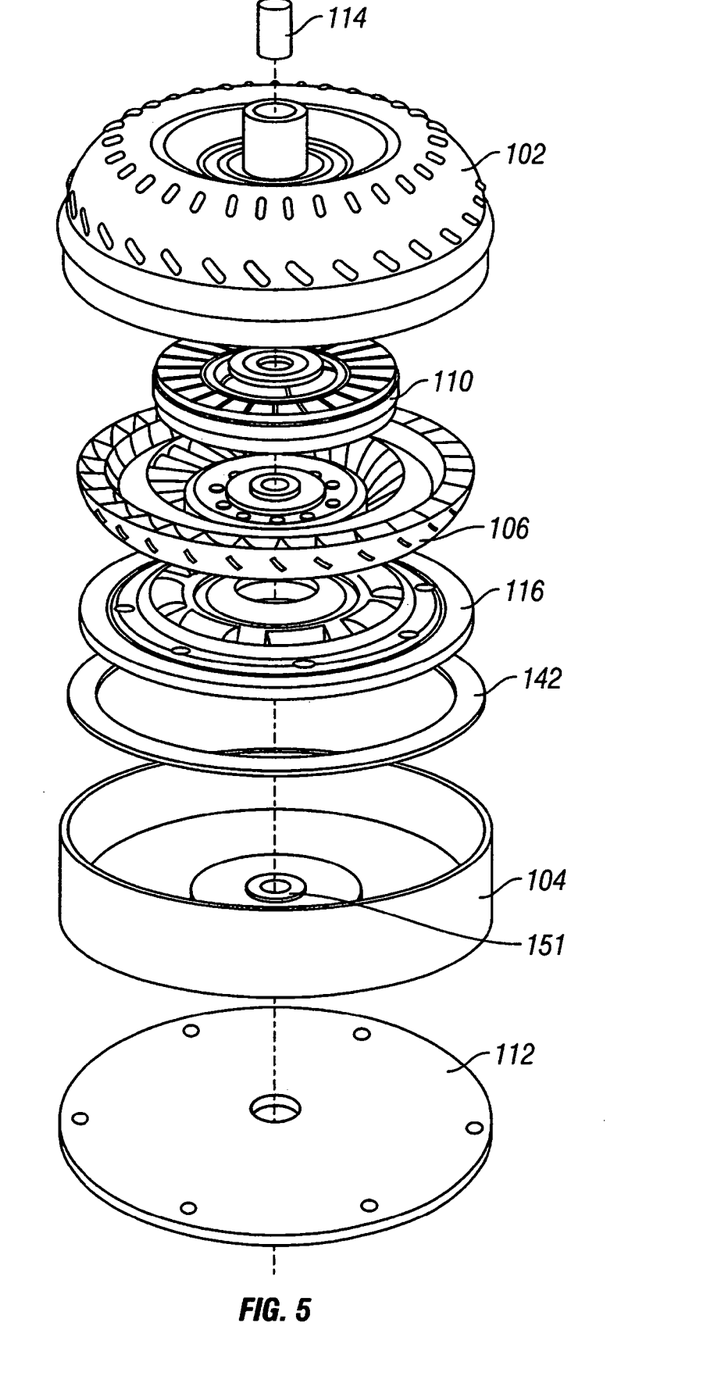
FIG. 5 is an exploded view of a torque converter in accordance with one embodiment of the present invention.

FIG. 5 is an exploded view of a torque converter having a floating clutch in accordance with one embodiment of the present invention. A floating clutch 142 is disposed between the piston 116 and the cover 104. It has been discovered that as the lock-up surface area increases, mechanical slippage decreases. A floating clutch 142 has a greater lock-up surface area than the friction-lined ledge 138 (depicted in FIG. 2). As used herein, the lock-up surface area is defined as the surface area available for frictional engagement between the piston 116 and the cover 104, and can include the piston 116 and the cover 104. One advantage of using a floating clutch 142 is the additional surface area provided from its two sides—a first side facing the piston 116 and a second side facing the cover 104. Unlike the floating clutch 142, the only lock-up surface area available in the prior art friction lined ledge 138, depicted in FIG. 2, is the side facing the piston 116 because the side facing the cover 104 is bonded to the cover 104 and is therefore unavailable for frictional engagement to the cover 104. In one embodiment, the floating clutch 142 is between one and one and one-half inches wide (transverse direction). Thus, because the floating clutch has two sides that contributes to lock-up surface area and because each side can be between two or three times the width of the prior art OE friction lining 138, the FIG. 5 embodiment of the present invention can have a lock-up surface area approximately four times the lock-up surface area of an OE torque converter such as the one shown in FIG. 2. As a result, mechanical slippage is reduced thereby increasing horsepower and fuel efficiency. Another advantage of a floating clutch 142 is that it is relatively easy and inexpensive to install in an OE torque converter. In one embodiment, the floating clutch 142 comprises Kevlar®. In one embodiment, the floating clutch 142 comprises a phenolic resin.

Figure 6:
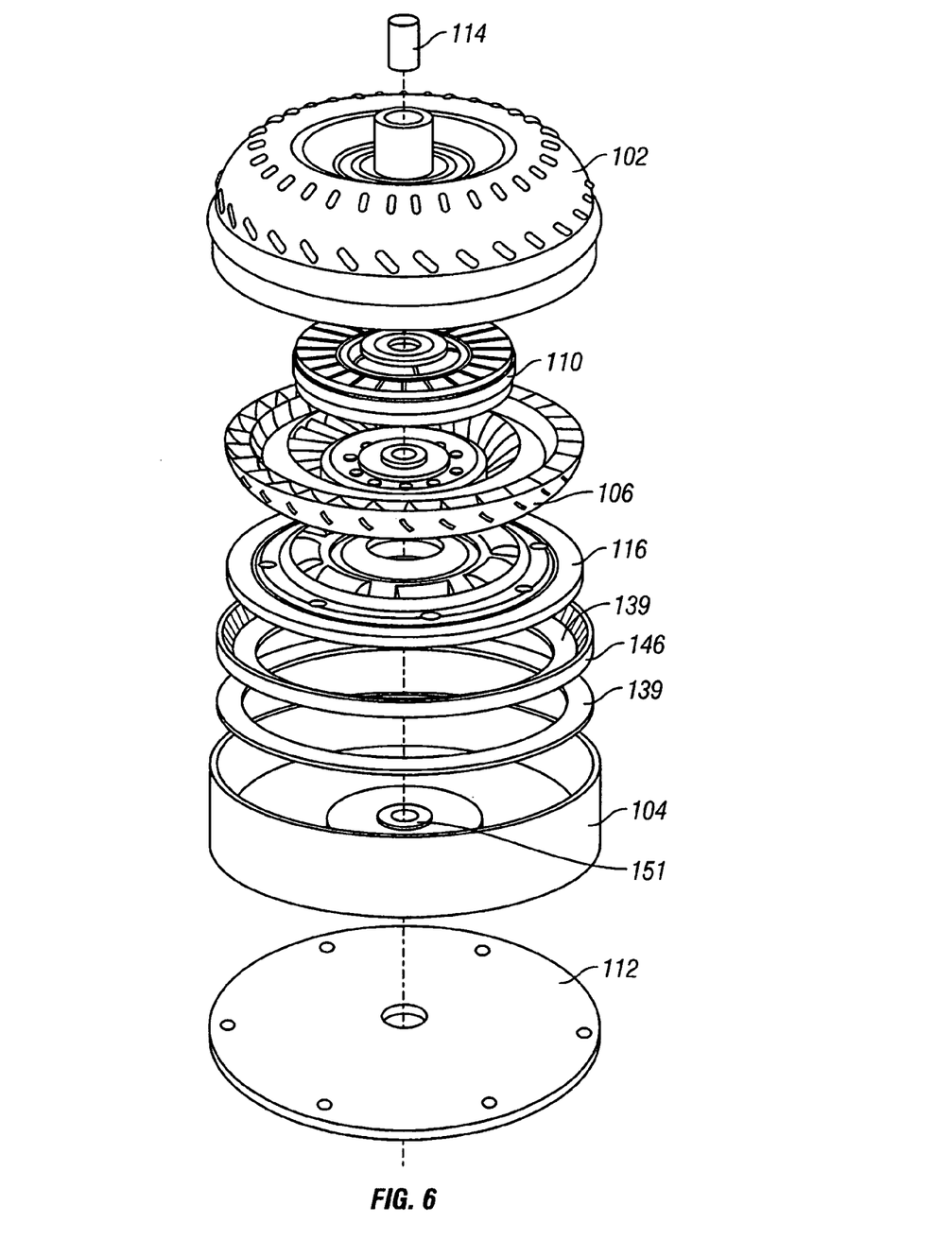
FIG. 6 is an exploded view of a torque converter in accordance with one embodiment of the present invention.

FIG. 6 is an exploded view of a torque converter having a floating clutch plate 146 in accordance with one embodiment of the present invention. As used herein, a floating clutch plate 146 comprises a steel plate with a friction liner 139 bonded to one or both sides of the plate. In the embodiment shown in FIG. 6, the floating clutch plate 146 has a friction liner 139 bonded to each side of the floating clutch plate 146. A floating clutch plate 146 is disposed between the piston 116 and the cover 104. The floating clutch plate 146 can be configured so as to maximize contact area with the piston 116. One advantage of providing a floating clutch plate 146 is the additional surface area provided from two sides of the floating clutch plate 146. In one embodiment, the floating clutch plate 146 is between one and one and one-half inches wide (transverse direction). In one embodiment, the floating clutch plate 146 comprises a lip that surrounds the outside circumference of the plate 146. In one embodiment, the lip is between about one-quarter and about one-half inches in length. In one embodiment, the lip of the steel plate is such that it permits the floating clutch plate 146 to mate with and stay mated to the piston 116 during lock-up. In one embodiment, the lip is beveled. Thus, because the floating clutch plate 146 and the floating clutch 142 each have two sides that contributes to lock-up surface area and because each side can be between two or three times the width of the prior art OE friction lining 138, the FIG. 6 embodiment of the present invention can have a lock-up surface area substantially higher than the lock-up surface area of an original equipment torque converter such as the one shown in FIG. 2. As a result, mechanical slippage is reduced thereby increasing horsepower and fuel efficiency.

Figure 7:
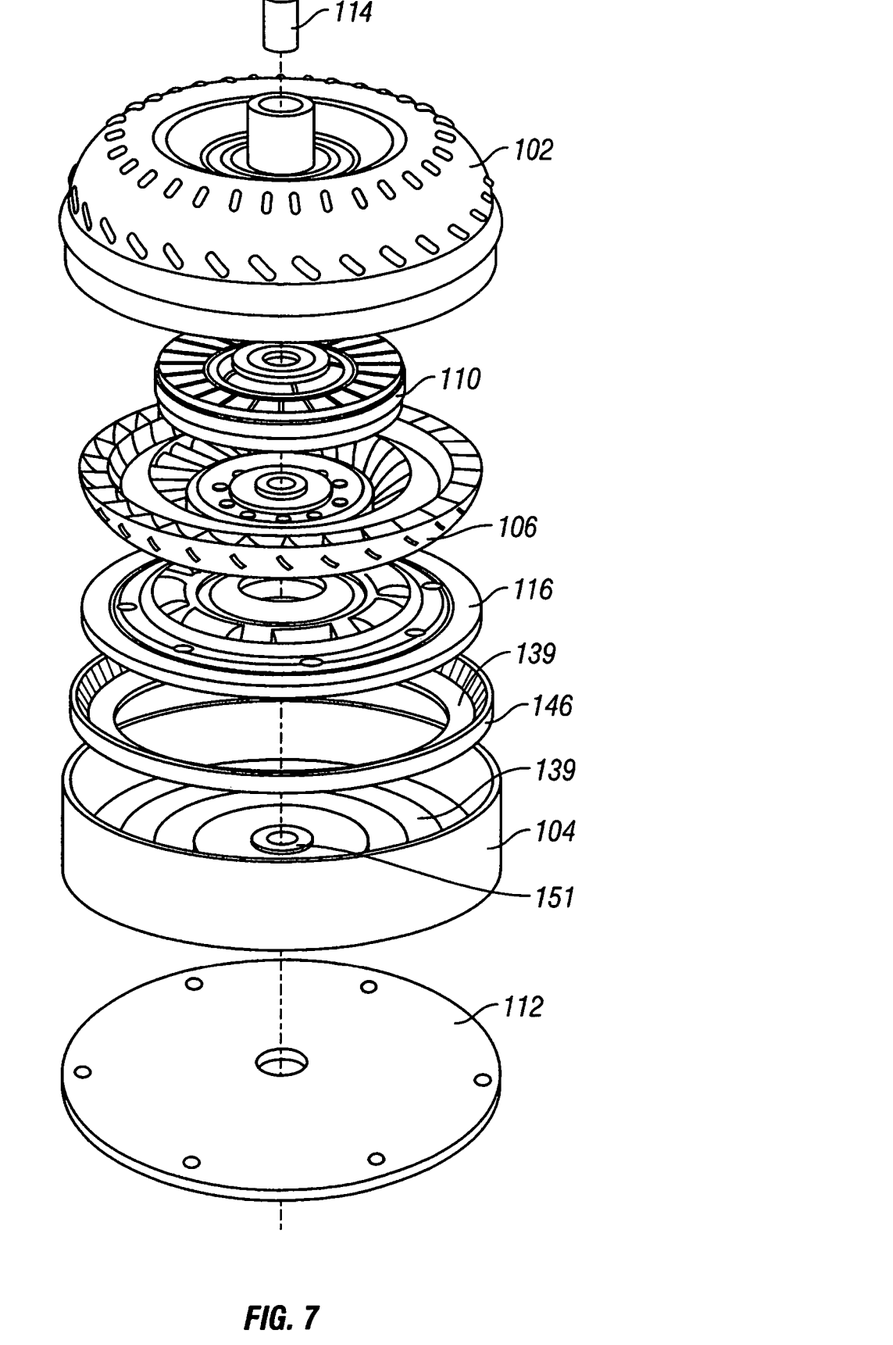
FIG. 7 is an exploded view of a torque converter in accordance with an alternative embodiment of the present invention.
Figure 10A:
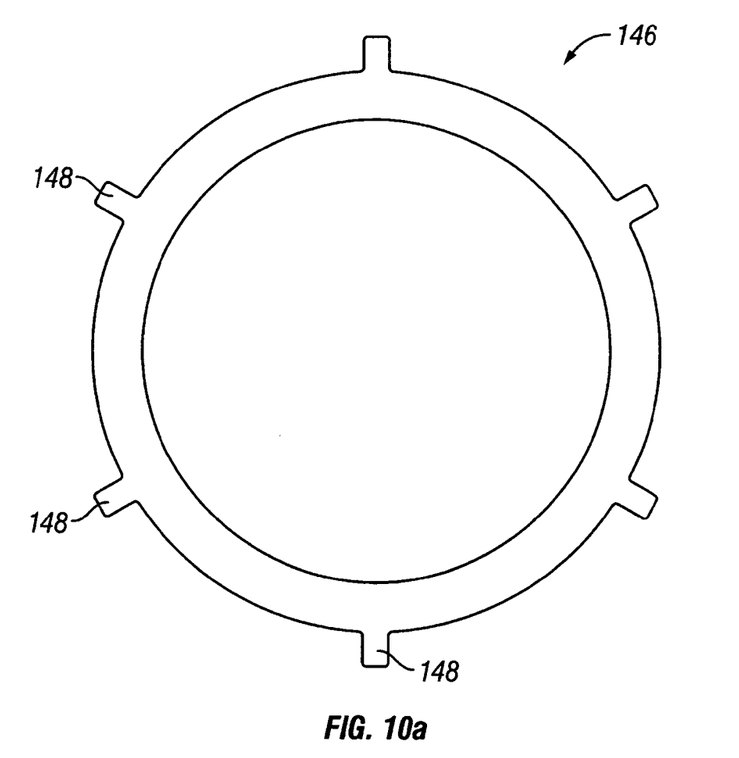
FIG. 10a is an impeller-side top view of an alternative embodiment of a floating clutch plate in accordance with one embodiment of the present invention.
Figure 10B:
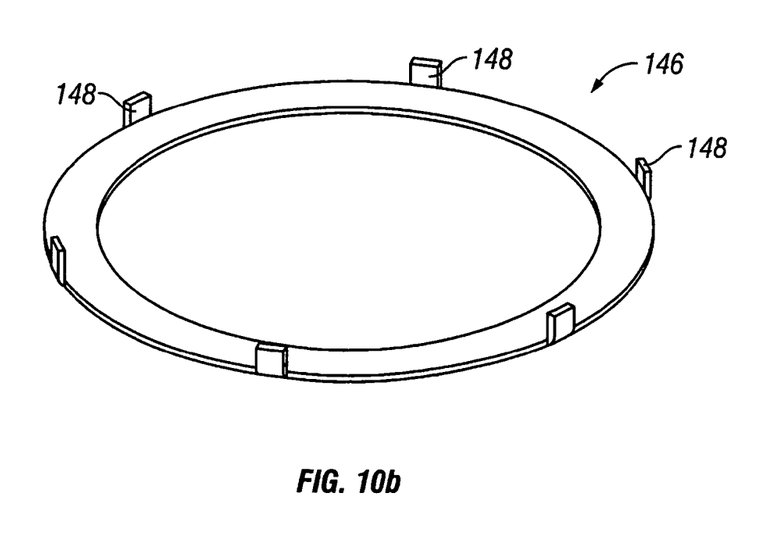
FIG. 10b is an impeller-side perspective view of an alternative embodiment of a floating clutch plate in FIG. 10a after the tabs have been bent upward.

FIG. 10a is an impeller-side top view of an alternative embodiment of a floating clutch plate 146 in accordance with one embodiment of the present invention. The floating clutch plate 146 having a plurality of tabs 148 is formed, for example, by a standard stamping, laser cutting or other similar operation. The tabs 148 are then bent upwards so that they are substantially perpendicular to the ring-shaped portion of the floating clutch plate 146. FIG. 10b is an impeller-side perspective view of an alternative embodiment of a floating clutch plate 146 in FIG. 10a after the tabs 148 have been bent upward. A friction lining (not shown) can be placed on one or both sides of the ring-shaped portion of the floating clutch steel plate 146 either before or after the tabs have been bent. The tabs 148 then function similar to the continuous lip depicted in FIGS. 6 and 7 that surrounds the outside circumference of the plate 146. Like the continuous lip depicted in FIGS. 6 and 7, the tabs 148 that form the intermittent lip permits the floating clutch plate 146 to mate with and stay mated to the piston 116, as shown in FIGS. 6 and 7, during lock-up. Thus, a floating clutch plate 146 with an intermittent lip can be manufactured for numerous different torque converter models in an easier more economical manner than a floating clutch plate 146 having a continuous lip.

It should be noted that in OE converters, centrifugal force causes the piston 116 to travel some distance along the axis to lock-up. Absent a travel distance, the torque converter would be in lock-up mode at all times. Adding components, such as a floating clutch plate 146 and/or a floating clutch 142 can reduce the amount of axial travel available to the piston 116. Thus, some components may need to be adjusted in the axial direction to ensure sufficient travel.

One way the adjustment can be made can be made to the cover 104 is to remove the friction lined ledge 138 depicted in FIG. 2. For example, if the floating clutch plate 146 is about 0.080 inches thick (axial direction) and the floating clutch 142 is about 0.040 inches thick, then about 0.115 inches can be removed from the ledge 138 inside the cover 104 to permit a space for travel. A floating or bonded clutch can then be placed adjacent the cover 104. In a preferred embodiment, the floating or bonded clutch is wider than the original friction lining on the cover 104 to provide more lock-up surface area. Alternatively, another component such as the piston 116 can be adjusted, alone or in conjunction with an adjustment to the cover 104 to permit the desired travel. These measurements and examples above are given for purposes of illustration and not limitation and those skilled in the art will understand from the above that the purpose is to increase the lock-up surface area while providing a way to permit the requisite travel so that the torque converter is not in lock-up mode at all times. In one embodiment, a second floating clutch plate 146 can be added to the torque converter and adjustments can made to the piston 116 and/or the cover 104 to permit the requisite travel.

FIG. 7 is an exploded view of a torque converter having a floating clutch plate 146 in accordance with an alternative embodiment of the present invention. Here one friction liner 139 is bonded to the piston 116 side of the floating clutch plate 146, and the other friction liner 139 is bonded to the cover 104. In an alternative embodiment (not shown) a second floating clutch plate 146 is disposed between the floating clutch plate 146 and the cover 104. In one embodiment, the friction liner 139 placed into the cover 104 is between about one and about one and one-half inches wide. Thus, because of the surface area provided by the floating clutch plate 146, the friction liner 139 between the floating clutch plate 146 and the piston 116, and a friction liner 139 bonded to the cover 104 having about two to about three times the width of the prior art friction lining 138, the FIG. 7 embodiment of the present invention can have a lock-up surface area substantially higher than the lock-up surface area of an original equipment torque converter such as the one shown in FIG. 2. As a result, mechanical slippage is reduced thereby increasing horsepower and fuel efficiency.

Figure 9A:
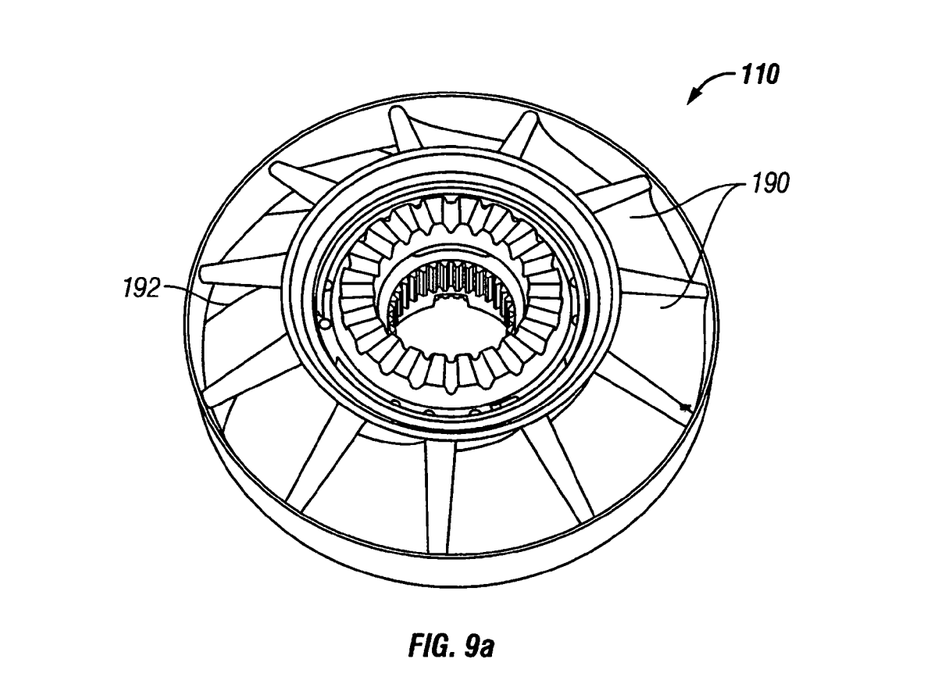
FIG. 9a is an impeller-side perspective view of a stator in accordance with one embodiment of the present invention.
Figure 9B:
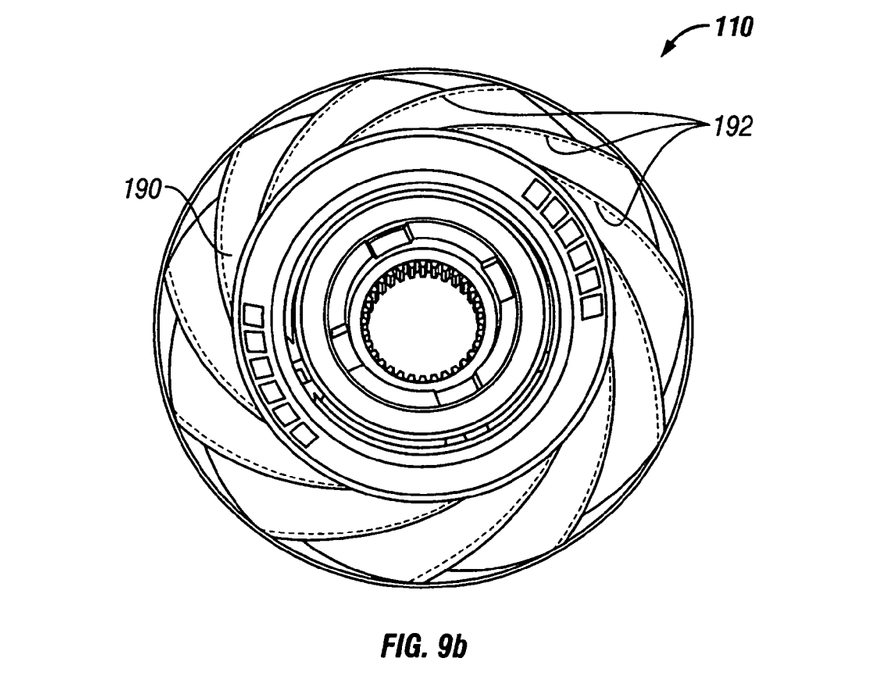

FIG. 9a is an impeller-side perspective view of a stator 110 in accordance with one embodiment of the present invention. FIG. 9b is a turbine-side perspective view of a stator 110 depicted in FIG. 9a. The stator 110 comprises a plurality of fins, vanes, or blades 190 which changes the fluid flow between the impeller 102 and the turbine 106 (as shown in FIG. 7) and is responsible for the torque multiplier effect. Since the principal purpose of the stator 110 is to provide a more efficient way for the Turbine RPM to approach the Impeller RPM and reduce hydrodynamic slippage, any change to the stator 110 that increases this efficiency is desirable as it can result in greater fuel efficiency and horsepower. It has been found that by removing a portion 192 of the vanes 190 on the turbine-side of an OE stator 110, the turbine RPM will more quickly approach the Impeller RPM, permitting to the torque converter to exit the stall mode and achieve lock-up mode in less time. In one test, a stator 110 from a Ford 4R70 W transmission was modified and 0.250 inches was cut off 192 from the vane 190. This change alone revealed an increase of 3.5% on fuel efficiency. Like all specific examples in this patent application, the numbers above are provided for illustration and not limitation.

Initial tests have shown a cumulative effect of lower lockup slippage and higher stator fluid flow can provide a 25% increase in fuel economy in relatively low ratio rear ends. For example, such vehicles include Ford vehicles having model numbers F150, E150, E250 and F250 having Ford 4R70 W transmissions with 4.6-liter engines. Models with the same transmissions and engines with higher rear end ratios such as Crown Victorias and Town Cars can achieve even higher increases in fuel economy.

Another improvement that can be made to the prior art torque converter depicted in FIG. 2 is that the OE piston 116 can be altered to add mass or weight and facilitate hold when the torque converter is in lock-up mode. In one embodiment, a steel metal ring is placed on the stator side of the piston 116. In one embodiment, the steel metal ring is about one-half inch thick.

There are several advantages with this invention. First, a low failure rate makes use of a torque converter economical. Thus, the return on installation costs can be high. For example, improved OE torque converters in accordance with the present invention can increase fuel economy by about 5% to about 55%. Thus, the savings achieved can be very especially substantial for high mileage vehicles such as delivery trucks and police cars. Second, torque converters can increase horsepower. Hence, pulling power is increased permitting easier transportation of heavier loads and/or quick acceleration. For example, torque converters in accordance with the present invention can increase horsepower by 10% over prior art OE converters. Whereas an OE torque converter has mechanical slippage of about 18%, an improved torque converter in accordance with the present invention has mechanical slippage of less than 9% and as low as between about 3% to 5%. Third, the invention can be easily and economically installed as an aftermarket product on existing vehicles.

While this invention has been particularly shown and described with reference to a preferred embodiment, it will be understood by those skilled in the art that various changes in form and detail may be made therein without departing from the spirit and scope of the invention.

What is claimed is:

1. An improved torque converter comprising:
   an impeller having a plurality of impeller blades attached to a cover;
   a turbine having a plurality of turbine blades between said impeller and said cover;
   a stator between said turbine and said impeller;
   a piston having a mass adjacent said turbine;
   a floating clutch plate having a friction liner bonded to both sides of said plate thereby defining a lock-up surface area wherein said floating clutch plate is disposed between said turbine and said cover; and
   a thrust washer having a first side attached to said cover and a second side facing said impeller, wherein said second side comprises at least one parabolic-shaped groove, each groove having a dome end and a leg end, wherein said groove permits unobstructed fluid flow between an inside circumference and an outside circumference.

2. An improved torque converter, said torque converter comprising:
   an impeller having a plurality of impeller blades attached to a cover;
   a turbine having a plurality of turbine blades between said impeller and said cover;
   a stator between said turbine and said impeller;
   a clutch pack comprising a piston and a lock up clutch wherein said clutch pack is disposed between said turbine and said cover; and
   a thrust washer having a first side attached to said cover and a second side facing said impeller, wherein said second side comprises at least one parabolic-shaped groove, each groove having a dome end and a leg end, wherein said groove permits unobstructed fluid flow between an inside circumference and an outside circumference.

3. The improved torque converter of claim 2 wherein said dome end of said parabolic shaped groove is in communication with said inner diameter of said thrust washer.

4. The improved torque converter of claim 2 wherein said dome end of said parabolic shaped groove is in communication with said outer diameter of said thrust washer.

5. The improved torque converter of claim 2 wherein said parabolic shaped groove is symmetrical.

* * * * *

UNITED STATES PATENT AND TRADEMARK OFFICE
CERTIFICATE OF CORRECTION

PATENT NO. : 7,080,720 B1
APPLICATION NO. : 11/065404
DATED : July 25, 2006
INVENTOR(S) : Robert Yarbrough et al.

It is certified that error appears in the above-identified patent and that said Letters Patent is hereby corrected as shown below:

Item (73) Assignee "Blumental Automatic Inc." should be updated to reflect --Blumenthal Automatics Inc.--

Signed and Sealed this

Twenty-first Day of November, 2006

JON W. DUDAS
*Director of the United States Patent and Trademark Office*